R. J. PAGE.
INDICATOR.
APPLICATION FILED APR. 3, 1917.
1,270,655.
Patented June 25, 1918.
2 SHEETS—SHEET 1.
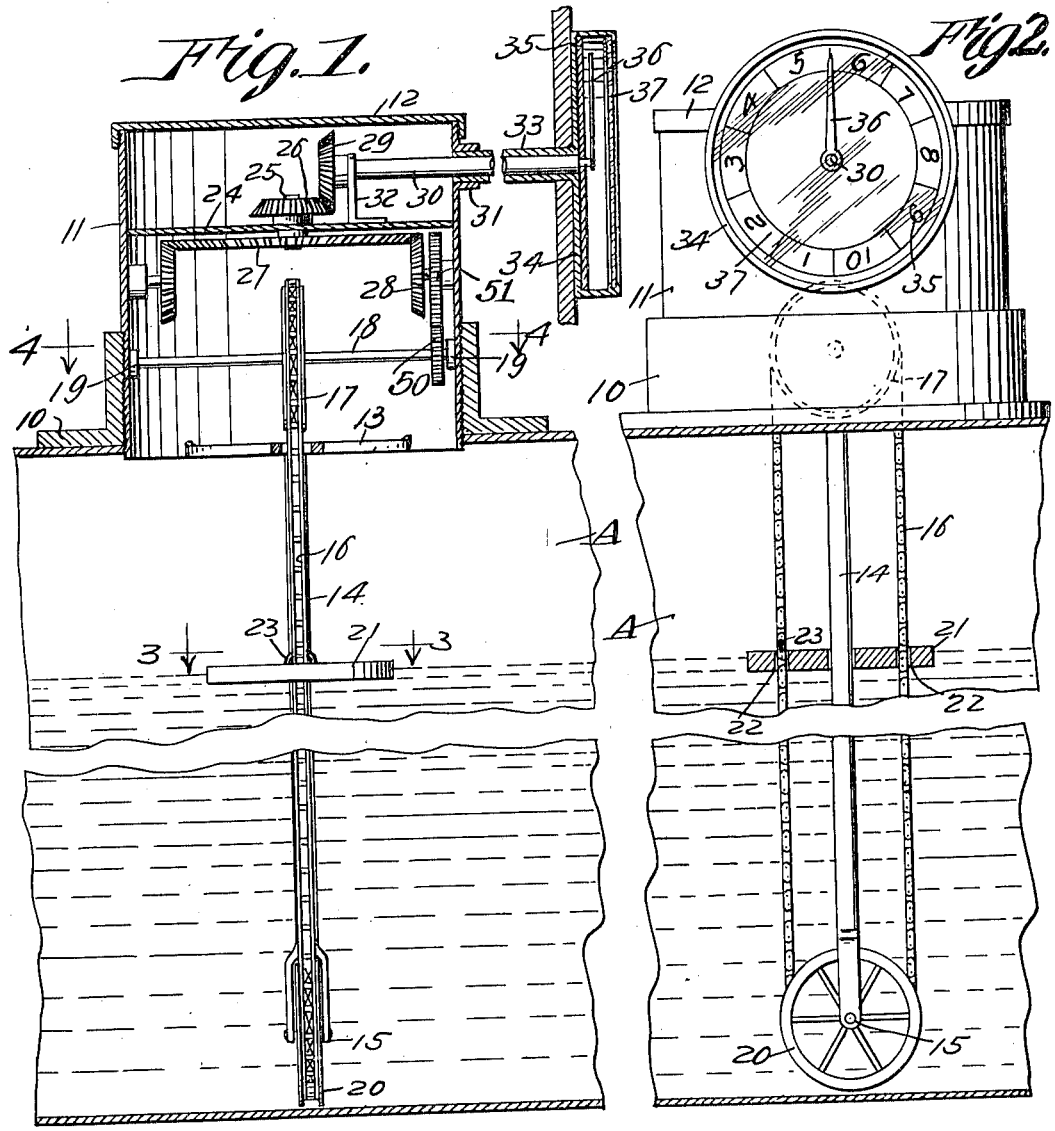
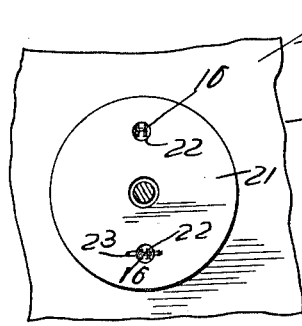
Inventor
Roy J. Page,
By Talbert & Parker
Attorneys

R. J. PAGE.
INDICATOR.
APPLICATION FILED APR. 3, 1917.

1,270,655.

Patented June 25, 1918.
2 SHEETS—SHEET 2.

Inventor
Roy. J. Page,
By Talbert & Parker
Attorneys

UNITED STATES PATENT OFFICE.

ROY J. PAGE, OF FRANKLIN, NEBRASKA.

INDICATOR.

1,270,655.  Specification of Letters Patent.  Patented June 25, 1918.

Application filed April 3, 1917.  Serial No. 159,567.

*To all whom it may concern:*

Be it known that I, ROY J. PAGE, a citizen of the United States, residing at Franklin, in the county of Franklin and State of Nebraska, have invented certain useful Improvements in Indicators, of which the following is a specification, reference being had therein to the accompanying drawing.

The invention relates to indicators, and more particularly to the class of automatic gages for gasolene tanks in automobiles or the like.

The primary object of the invention is the provision of a gage of this character wherein the quantity of gasolene contained within a tank can be accurately determined, the gage being readable at a glance and automatically operating on the consumption of the contents of the tank and the filling thereof.

Another object of the invention is the provision of a gage of this character wherein the construction thereof is novel in form for the positive operation thereof, the parts being assembled to assure compactness for occupying the least possible space.

A further object of the invention is the provision of a gage of this character which is simple in construction, thoroughly reliable and efficient in operation, strong, durable and inexpensive of manufacture.

Other objects will be in part obvious and in part hereinafter set forth.

The invention accordingly consists in the features of construction, combination of elements and arrangement of parts which will be exemplified in the construction hereinafter described, the scope of the application of which will be indicated in the appended claims.

In the accompanying drawings:

Figure 1 is a fragmentary vertical sectional view through a gasolene tank showing the gage constructed in accordance with the invention applied thereto;

Fig. 2 is a fragmentary side elevation;

Fig. 3 is a sectional view on the line 3—3 of Fig. 1;

Similar reference characters indicate corresponding parts throughout the several views of the drawings.

Figure 4:
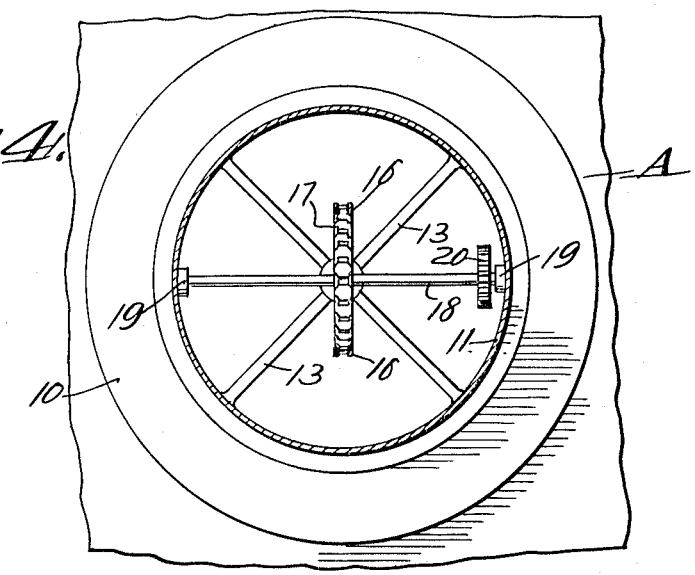
Fig. 4 is a sectional view on the line 4—4 of Fig. 1.

Referring to the drawings in detail, A designates a portion of a tank adapted to contain gasolene and is usually located within the automobile under the front seat, although the tank can be mounted on the automobile at any point and may be of any construction, as the same is merely illustrated to show the application, manner of use and the operation of the gage hereinafter fully described.

Formed in the top of the tank A is a suitable opening, about which is concentrically arranged a collar 10 which is fastened to the top in any suitable manner and detachably receives the gage which comprises a cylindrical body 11, the same being preferably threaded in the collar 10 and has removably fitted thereon a screw cap 12, while interiorly of the body 11 at the lower inner end thereof is a cross brace 13 in which is fixed a depending guide 14 which extends downwardly within the tank A the required distance, and at the lower end of this guide is a journal 15 which extends at right angles 80 thereto for supporting the float operating mechanism hereinafter fully described.

The float operating mechanism comprises an endless chain 16 which is trained over a sprocket wheel 17 fixed to a shaft 18 located within the body 11 above the brace 13 and supported in the bearings 19 at diametrically opposite points in said body, the chain being also trained over a flanged guide wheel 20 which is rotatably mounted on the journal 15 at the lower end of the guide 14, while slidable upon said guide is a float 21 which is formed with holes 22 through which loosely pass the stretches of the chain 16, one stretch of the latter being fastened at 23 to the said float so that on movement of the float by the rise and fall of gasolene or other fluid contained within the tank the chain 16 will be actuated thereby.

Above the sprocket wheel 17, interiorly of the body 11 of the gage, is a solid partition 24 which has journaled centrally therein a stud shaft 25 which carries the respective beveled gears 26 and 27 at opposite sides of the partition, and meshing with the gear 27 is a beveled pinion 28 which is driven by the shaft 18 through the instrumentality of the gears 50 and 51. Meshing with the gear 26 is a beveled pinion 29 for operating an indicator hereinafter fully described.

The pinion 29 is fixed to the inner end of an indicator shaft 30 which is supported in the bearings 31 and 32, respectively, the bearing 31 being on the body 11 while the bearing 32 rises from the partition 24 interiorly of said body. The shaft 30 extends outwardly exteriorly of the body 11 and is concealed within a housing tube 33 which is fixed to the bearing 31, and this tube supports a dial case 34 having a dial 35 provided with suitable indicia indicative of a predetermined measurement of the gasolene or other liquid contained within the tank and is traversable by an indicator or pointer hand 36 which is fixed to the shaft 30, the case 34 being fitted with a glass panel 37 through which is readable the dial 35 coöperating with the hand 36 which is actuated by the float mechanism on the rise and fall of the float 21 within the tank, as will be obvious.

Figure 5:
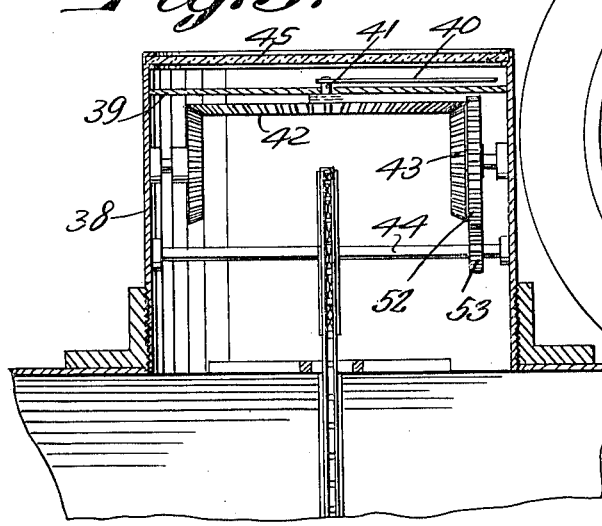
Fig. 5 is a view similar to Fig. 1, showing a modified form of the invention.
Figure 6:
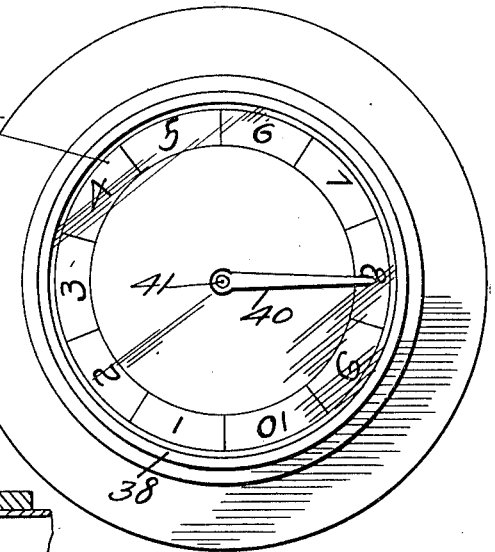
Fig. 6 is a fragmentary top plan view.

In Figs. 5 and 6 there is shown a slight modification of the invention, wherein the body 38 of the gage has arranged interiorly thereof, spaced from its upper end, a dial 39 having suitable indicia representing the quantity of gasolene or fluid within the tank, and over this dial is traversable an indicator or pointer hand 40 which is fixed to a stud shaft 41 journaled centrally in the dial 39, and the hand coöperates with the indicia on the dial for determining the quantity of gasolene or fluid within the tank. The stud shaft 41 has fixed thereto beneath the dial 39, the hand 40 being above the same, a beveled gear 42 which is driven by shaft 44 through the instrumentality of gears 52 and 53. The shaft 44 is controlled by the float mechanism hereinbefore set forth.

In the outer end of the body 38 is a glass panel 45 through which is readable the dial 39 coöperating with the hand 40 for accurately determining the quantity of gasolene or fluid contained within the tank either when the same is being consumed or on the filling of the tank.

From the foregoing description, taken in connection with the accompanying drawings, the construction and operation of the herein described indicator will be readily apparent and, therefore, a more extended explanation has been omitted.

Having thus described my invention, I claim:

1. A gage of the character described comprising a cylindrical body adapted for detachable mounting upon a tank, a shaft horizontally disposed and journaled within the body, a guide depending from the body interiorly of the tank, a float slidable on the guide, a guide wheel on said guide, a sprocket wheel fixed to the shaft, an endless chain trained over the guide and sprocket wheel and having one stretch connected with the float, and an indicator having gear connection with the shaft for operation thereby.

2. A gage of the character described comprising a cylindrical body adapted for detachable mounting upon a tank, a shaft horizontally disposed and journaled within the body, a guide depending from the body interiorly of the tank, a float slidable on the guide, a guide wheel on said guide, a sprocket wheel fixed to the shaft, an endless chain trained over the guide and sprocket wheel and having one stretch connected with the float, a dial having indicia thereon, an indicator hand traversable over the dial, connections between the indicator hand and said shaft for operation of the hand thereby, and a transparent panel covering the dial.

3. A gage of the character described comprising a cylindrical body adapted for detachable mounting upon a tank, a shaft horizontally disposed and journaled within the body, a guide depending from the body interiorly of the tank, a float slidable on the guide, a guide wheel on said guide, a sprocket wheel fixed to the shaft, an endless chain trained over the guide and sprocket wheel and having one stretch connected with the float, a dial having indicia thereon, an indicator hand traversable over the dial, connections between the indicator hand and said shaft for operation of the hand thereby, a transparent panel covering the dial, and a support for the connections between the indicator hand and the shaft.

In testimony whereof I affix my signature.

ROY J. PAGE.